June 10, 1930.    C. C. SANCKEN    1,763,446
AUTOMATIC BUNDLE TRIPPING MECHANISM FOR BINDERS
Filed Jan. 26, 1929    2 Sheets-Sheet 1
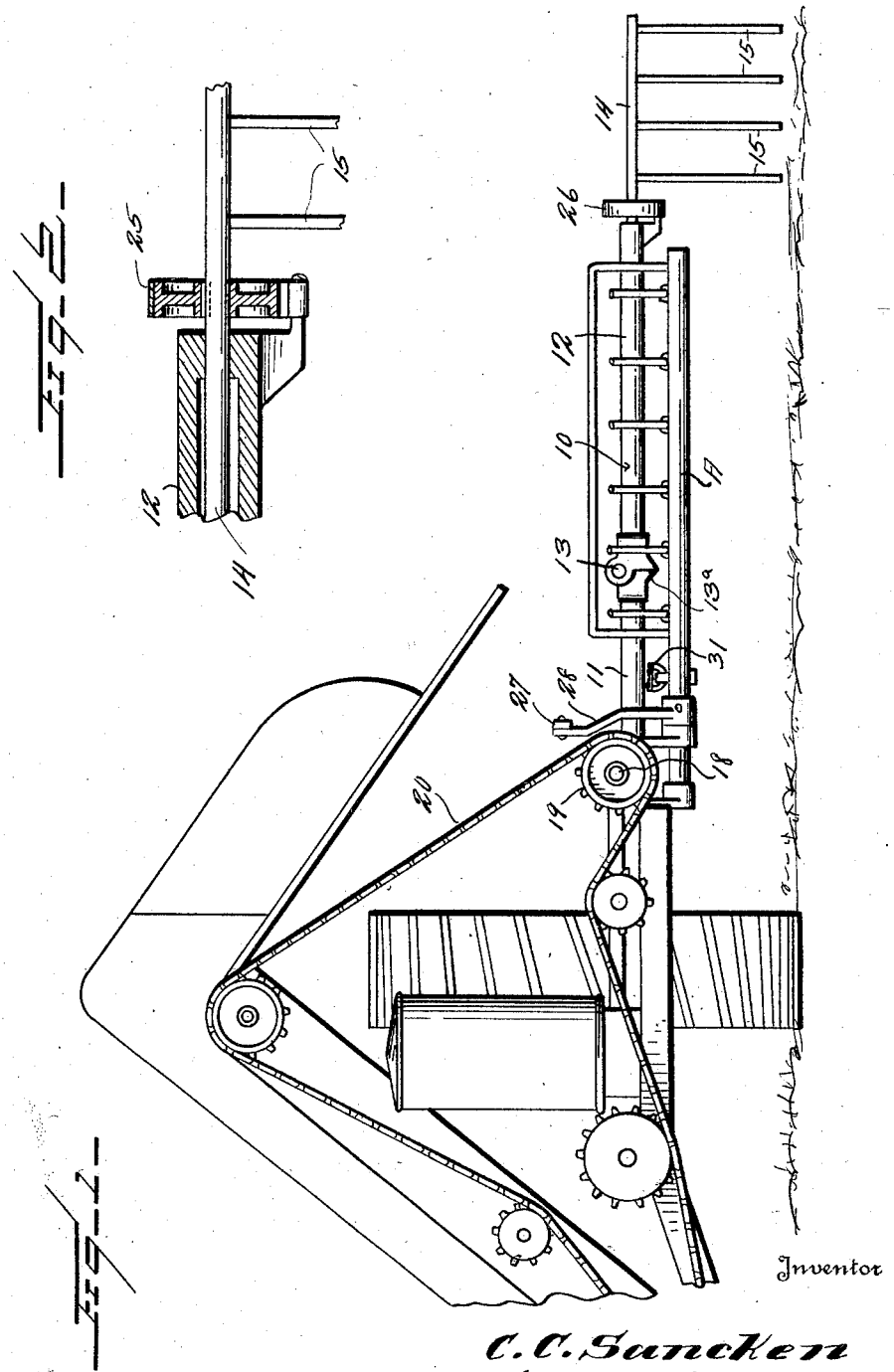
Inventor
C. C. Sancken
By Watson E. Coleman
Attorney

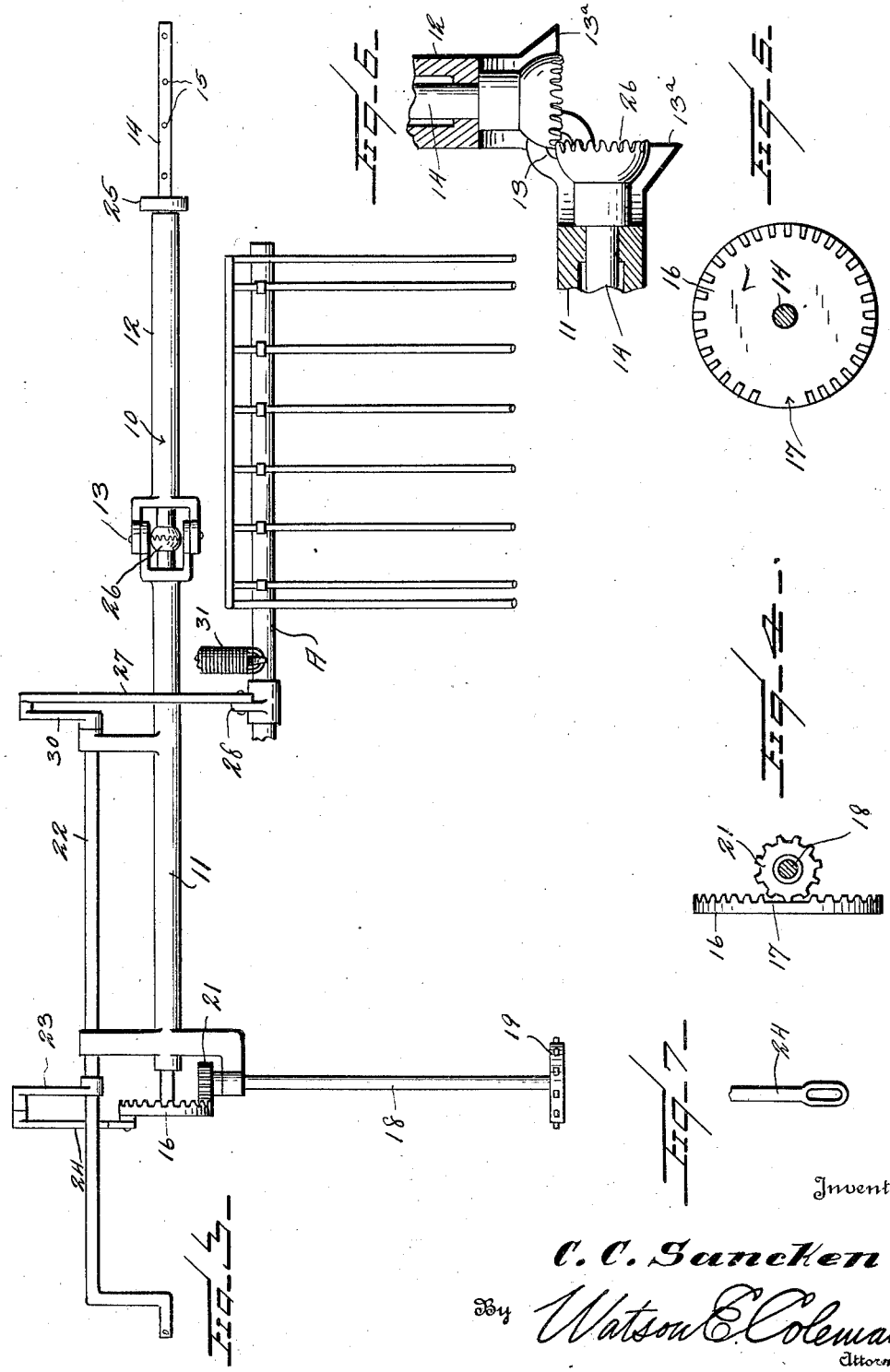

Patented June 10, 1930

1,763,446

UNITED STATES PATENT OFFICE

CARL C. SANCKEN, OF SAUNEMIN, ILLINOIS

AUTOMATIC BUNDLE-TRIPPING MECHANISM FOR BINDERS

Application filed January 26, 1929. Serial No. 335,233.

This invention relates to harvesters and particularly to the bundle dumping mechanism of harvesters.

The general object of my invention is to provide a dumping mechanism so constructed that the bundles will be discharged so as to form a swathe or windrow.

A further object is to provide a device of this character which automatically releases the bundle dumping mechanism when the binder or harvester has reached a point where other bundles have been dumped and particularly to provide bundle engaging tines or fingers carried upon a projecting tubular arm and connected to the bundle carrier trip so that when these tines strike a bundle or bundles which have previously been discharged from the machine, the tines will tilt, causing the oscillation of the shaft to which they are connected which will cause the operation of the bundle discharging mechanism.

Another object in this connection is to provide power operated means for operating the bundle discharging mechanism thrown into action by movement of the bundle engaging tines.

Other objects will appear in the course of the following description.

In the drawings:—

Figure 1 is a fragmentary elevation of a binder or harvester having my automatic bundle dumping mechanism applied thereto;

Figure 2 is a fragmentary section through one end of the tubular arm showing a brake;

Figure 3 is a top plan view of my attachment showing diagrammatically its connection to the dumping carrier;

Figure 4 is a section through the driving shaft looking toward the gear wheel;

Figure 5 is a front elevation looking toward the mutilated gear wheel;

Figure 6 is a detailed fragmentary view of the joint between the two sections of the shaft and the two sections of the shaft housing;

Figure 7 is a fragmentary elevation of one end of the connecting rod 24.

In the drawings, it will be seen that I have illustrated a portion of a McCormick harvester and binder, though it is to be understood that my mechanism might be applied with modification to other forms of binders and harvesters. In this form of harvester the bundle carrier A is tiltable by a trip on the binder. As before remarked, my device is intended to provide automatic means to operate the bundle carrier to discharge the bundles therefrom. To this end, I mount upon the harvester frame and projecting laterally outward therefrom in front of the bundle carrier, the tubular sectional arm 10 illustrated as formed in two sections 11 and 12, the sections being connected by a flexible joint 13 which permits the right hand section of the arm to be raised or lowered.

Extending through this arm 10 is a shaft 14 likewise formed in two sections as will be later stated. This shaft upon its outer end carries upon it a plurality of normally downwardly extending tines 15 and at its rear end carries a gear wheel 16 having its teeth interrupted at one point as at 17. Suitable bearings are formed within the tube 12 within which the shaft 14 may be mounted. Associated with the gear wheel 16 is a transverse shaft 18 carrying at one end a sprocket wheel 19, this shaft 18 extending from front to rear of the binder on the rear end thereof and engaging with the sprocket chain 20 which, in this form of binder, operates most of the working parts. The inner end of the shaft 18 carries upon it the pinion 21 which is adapted to mesh with the teeth on the gear wheel 16. Thus, when the teeth are in mesh it will be obvious that the gear wheel 16 and the shaft 14 will be turned by power.

The bundle carrier A in this form of binder is operated by a rod 22 which is unnecessary to illustrate in detail, this rod having a radially extending arm 23 at its inner end. Mounted upon the gear wheel 16 is a connecting rod 24 which is pivoted on the gear wheel and is pivoted to the arm 23. The tubular arm 10 within which the shaft 14 is disposed is mounted on the binder frame in any suitable manner and projects out laterally therefrom as before stated so that after bundles have been discharged upon the ground on a previous round of the machine, the tines 15 will strike a bundle or bundles and this will turn the tines and the shaft 14 upward and rearward.

Normally the pinion 21 is disposed within the blank space 17 but when the shaft 14 is turned even slightly the teeth on the gear wheel 16 are brought into mesh with the pinion 21, which with the shaft 18 is constantly operating, and this will cause the complete rotation of the gear wheel 16 under power and this, of course, will cause a complete rotation of the shaft 14 so that the tines 15 will be brought around to their initial point again. Of course, when the gear wheel 16 has made one complete revolution, the mutilated portion of the wheel will escape the pinion 21 and the wheel 16 will stop. As the wheel 16 rotates the connecting rod 24 will be pushed outward and the arm 23 will be given approximately a quarter revolution and upon a further rotation of the gear wheel 16, the rod 24 will be drawn rearward and a reverse oscillatory movement will be given to the rod 22. This oscillation is sufficient to cause the ordinary bundle carrier trip mechanism to be actuated to release the bundle carrier and discharge the bundles on the ground.

Preferably, the forward end of the tubular arm 12 will be provided with a brake band 25 so as to prevent any overrunning of these parts so that the tines 15 will always stop when they are in a depending position. Preferably also, as before remarked, the tubular arm 10 is formed in two sections 11 and 12 connected by a flexible joint 13 and, of course, the shaft 14 will be formed in two sections under these same circumstances connected by gearing designated generally 26 which will transmit motion from one section to the other but at the same time permit the two sections to be disposed in angular relation to each other or in alined relation.

The joint of the tubular arm is provided with a stop 13ª preventing the movement of the upper section of the tubular arm below a horizontal plane. Any flexible joint may be used for the shaft 14 which will cause the transmission of rotation whether the sections are disposed in alinement or at an angle to each other.

In Figure 3 I have illustrated diagrammatically the connections of the bundle carrier A to the harvester and to my tripping mechanism. As shown the shaft of the bundle carrier A is provided with the arm 28 which is pivotally engaged with a connecting rod 27 extending to a crank 30 mounted upon the shaft 22 so that as this shaft 22 is oscillated the bundle carrier A will be also oscillated. The spring 31 which is commonly used for drawing the bundle carrier back to its receiving position is in this instance used for the purpose of retaining the bundle carrier in its horizontal position. It will be understood that the shaft 22 and the connecting rod 27 with the crank arms 28 and 30 are commonly found on bundle carriers and that the shaft 22 extends laterally and is cranked at one end and is there connected to a pedaly operated mechanism not shown. Ordinarily the operator depresses the trip to cause the depression of the bundle carrier and the discharge of the bundles therefrom, but with my mechanism the bundle carrier is not discharged until the fingers 15 strike the previously deposited bundles.

It will be noted from Figure 7 that the connecting rod 24 is slotted at one end. As the wheel 16 is rotated under the action of the gear wheel 21 and constantly rotating shaft 18, it dumps the bundle carrier A and with the assistance of the spring 29 returns the bundle carrier to its original position.

The object of this slot in the extremity of the connecting rod 24 is that the slot lets the carrier stay down just a little while before raising it up. This gives the bundles a chance to slide off which would not be the case were there no slot in the extremity of the arm 24.

It will be understood that any construction may be used to permit the two sections of the shaft 14 to be turned relative to each other so that the outer section may be raised to a vertical position so that when the machine is travelling close to a fence or other obstruction, the shaft with the tubular arm section 12 may be raised. The only reason for having the outer shaft section connected rotatably at all times with the inner shaft section 14 is that this does away with the necessity of alining clutches with each other when the outer shaft section is turned downward to a horizontal position. By the means which I have provided the outer shaft section 14 will rotate whether it is turned up or down.

In the operation of this attachment, it is necessary that the operator should personally dump bundles for the first few rounds and then this device is put into use and every time the tines 15 strike a pile of bundles which were dumped on a round before, the bundle carrier will be tilted to discharge its bundles and thus it places the bundles in windrows, ready for shocking. In this construction, it will be seen that the device is very simple and is positively operated by power.

Obviously many changes may be made in the details of construction without departing from the spirit of the invention as defined in the appended claims.

I claim:—

1. The combination with a binder having a bundle carrier mounted for dumping movement, of a member projecting out from the machine on one side thereof and having oscillatable fingers adapted to engage with previously deposited bundles and be oscillated thereby, means operatively connecting the fingers to the bundle carrier to release the same when the fingers are oscillated upon contact with a previously deposited bundle and brake means engaging said projecting member whereby to retard the rotary movement thereof.

2. In a binder, the combination with a bundle carrier tiltable to discharge its load, of means for automatically tilting the bundle carrier comprising a shaft extending outward from the binder and having normally depending fingers at its outer end, the fingers and shaft being unitarily oscillatable, tripping mechanism for the bundle carrier, retarding means engaging said shaft for retarding the rotary movement thereof, means on the inner end of the shaft operatively connected to said tripping mechanism whereby as the shaft is rotated the tripping mechanism will be operated, constantly driven power means for said shaft, and means actuated by an initial rotative movement of the fingers and shaft acting to operatively connect the constantly operated power mechanism with the shaft, said means automatically disconnecting the shaft from the power operated mechanism when it has made one complete turn.

3. The combination with a binder having a tiltable dumping carrier and means for releasing the bundle carrier and causing it to tilt, of means for operating said releasing means comprising a tubular arm extending laterally from the binder in advance of the bundle carrier, a shaft disposed within the tubular arm and at its outer end carrying normally depending tines, a brake drum mounted on said shaft, a brake band carried by said arm and frictionally engaging said drum whereby to retard the rotary movement of said shaft, a gear wheel mounted upon the inner end of the shaft and having mutilation therein, a connecting rod mounted upon the gear wheel and reciprocated thereby and having operative connection to the bundle carrier trip mechanism, and a constantly operated power driven shaft mounted upon the binder and having a pinion normally disposed within the mutilation of said gear wheel, the fingers acting when turned by contact with the previously deposited bundle to shift the gear wheel into operative engagement with the pinion to thus cause a complete rotation of the gear wheel.

4. The combination with a binder having a bundle carrier and tripping mechanism therefor, of means for automatically actuating the tripping mechanism comprising a tubular arm extending laterally outward from the binder and supported on the frame thereof, a shaft extending through the tubular arm and projecting beyond the same and provided with normally depending tines at one end, a brake drum on said shaft, a brake band carried by said arm and frictionally engaging said drum whereby to retard the rotation thereof, the other end of the shaft being provided with a toothed wheel, the teeth being mutilated at one point, a connecting rod pivotally engaged with said wheel and reciprocated thereby and operatively connected to the carrier tripping mechanism, and a shaft mounted on the binder and constantly driven therefrom and having a pinion on its inner end adapted to engage with the teeth on the gear wheel and normally disposed in the mutilated portion of said gear wheel, the oscillation of the shaft due to the fingers striking a previously deposited bundle acting to operatively engage the gear wheel with the pinion and thus cause the rotation of the gear wheel and the oscillation of the connecting rod to the bundle carrier tripping mechanism.

5. The combination with a binder having a bundle carrier and tripping mechanism therefor, of means for automatically actuating the tripping mechanism comprising a tubular arm extending laterally outward from the binder and supported on the frame thereof, a shaft extending through the tubular arm and projecting beyond the same and provided with normally depending tines at one end, a brake drum on said shaft, a brake band carried by said arm and frictionally engaging said drum whereby to retard the rotation thereof, the other end of the shaft being provided with a toothed wheel, the teeth being mutilated at one point, a connecting rod pivotally engaged with said wheel and reciprocated thereby and operatively connected to the carrier tripping mechanism, and a shaft mounted on the binder and constantly driven therefrom and having a pinion on its inner end adapted to engage with the teeth on the gear wheel and normally disposed in the mutilated portion of said gear wheel, the oscillation of the shaft due to the finger striking a previously deposited bundle acting to operatively engage the gear wheel with the pinion and thus cause the rotation of the gear wheel and the oscillation of the connecting rod to the bundle carrier tripping mechanism, the tubular arm being formed in two flexibly connected sections and the shaft being formed in two operatively engaged sections permitting the shaft to be turned with the outer section of the tubular arm into angular relation with the inner section.

In testimony whereof I hereunto affix my signature.

CARL C. SANCKEN.